(12) United States Patent
Falk et al.

(10) Patent No.: US 7,008,657 B2
(45) Date of Patent: Mar. 7, 2006

(54) METHOD AND APPARATUS FOR COOKING MEAT

(75) Inventors: Jon Allan Falk, Milwaukee, WI (US);
Mien Sen Chu, Gurnee, IL (US);
Michael Desmet, Franklin, WI (US);
Jason Kapella, Milwaukee, WI (US)

(73) Assignee: Patrick Cudahy, Inc., Cudahy, WI (US)

( * ) Notice: Subject to any disclaimer, the term of this patent is extended or adjusted under 35 U.S.C. 154(b) by 478 days.

(21) Appl. No.: 10/288,331

(22) Filed: Nov. 6, 2002

(65) Prior Publication Data

US 2004/0086610 A1    May 6, 2004

(51) Int. Cl.
*A23B 4/01*    (2006.01)
(52) U.S. Cl. ............... 426/233; 426/243; 426/518; 426/519; 426/523; 426/524; 99/353; 99/355; 99/386; 99/443 C; 99/451; 99/537
(58) Field of Classification Search .......... 426/233, 426/241–243, 641, 645–646, 518–520, 523, 426/524; 99/353, 355, 386, 443 C, 451, 99/537
See application file for complete search history.

(56) References Cited

U.S. PATENT DOCUMENTS

| | | | | |
|---|---|---|---|---|
| 4,450,183 A | * | 5/1984 | Steinberg et al. | 426/646 |
| 4,687,672 A | * | 8/1987 | Vitkovsky | 426/524 |
| 5,423,250 A | * | 6/1995 | Anderson et al. | 99/537 |
| 5,637,342 A | | 6/1997 | Brooks et al. | |
| 5,736,186 A | * | 4/1998 | Holdren et al. | 426/646 |
| 5,798,133 A | | 8/1998 | Kunert | |
| 5,837,305 A | | 11/1998 | Kunert | |
| 5,942,265 A | * | 8/1999 | Roberds et al. | 426/59 |
| 5,965,187 A | * | 10/1999 | Freda et al. | 426/513 |
| 5,997,925 A | | 12/1999 | Wilson et al. | |
| 6,051,264 A | * | 4/2000 | Afman et al. | 426/243 |
| 6,224,927 B1 | * | 5/2001 | Paulos et al. | 426/266 |
| 6,391,355 B1 | | 5/2002 | Kunert et al. | |
| 2002/0031599 A1 | | 3/2002 | Kunert et al. | |

\* cited by examiner

*Primary Examiner*—Drew Becker
(74) *Attorney, Agent, or Firm*—Hunton & Williams

(57) ABSTRACT

A method and apparatus for preparing cooked particulate meat products, such as bacon bits or other bacon seasonings and toppings. The raw meat is ground to a first size in a first grinder, mixing with dry cure and water to form a raw meat mixture, cooled and stored. The raw meat mixture is then diced to a second size in a first dicer, evenly spread onto a cooking belt, cooked in one or more continuous cooking ovens to form a cooked meat mixture and diced again to a third size in a second dicer.

57 Claims, 4 Drawing Sheets

Fig. 5
Fig. 6
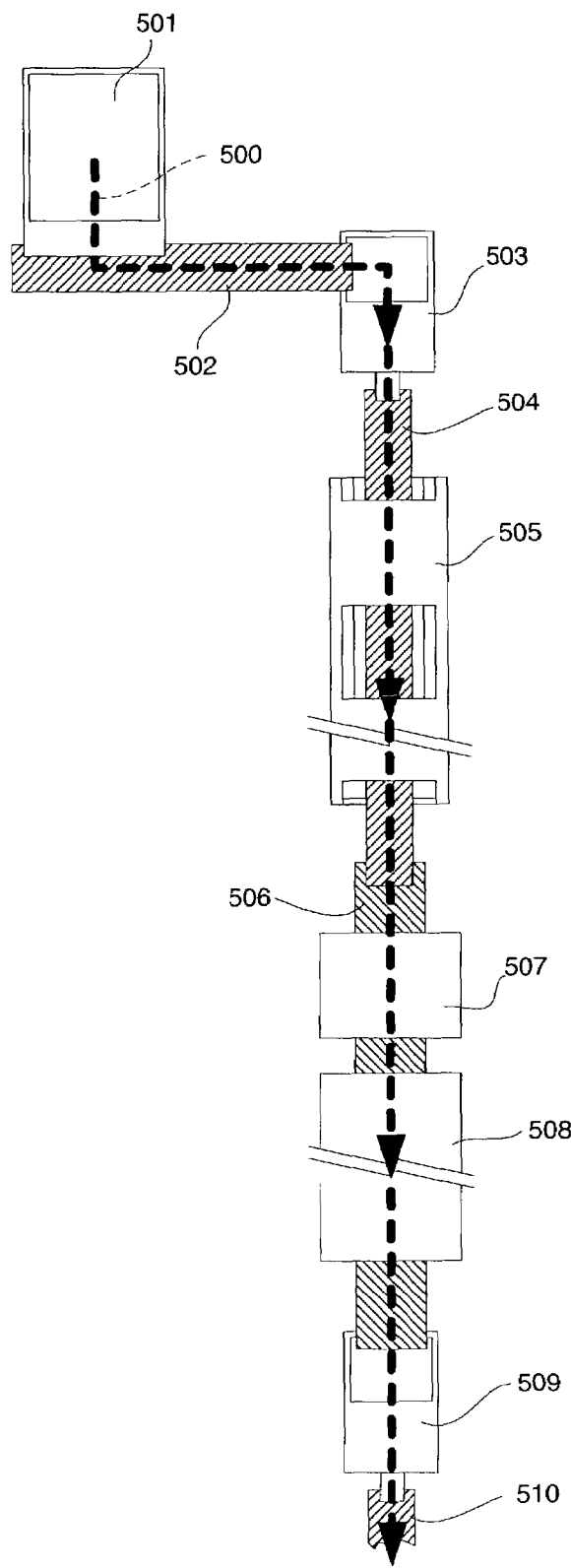
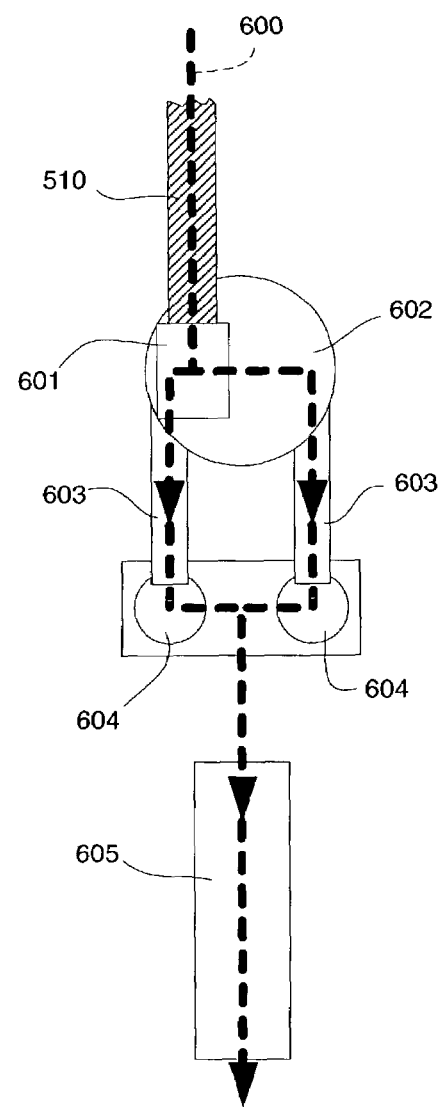

METHOD AND APPARATUS FOR COOKING MEAT

TECHNICAL FIELD

The present invention relates to methods for preparing particulate cooked meat products, such as particulate pork products (commonly referred to as bacon bits). More specifically, the present invention relates to a method for cooking particulate meat products, such as bacon bits, using raw meat rather than smoked or similarly prepared meat.

BACKGROUND OF THE INVENTION

It is known to produce various bacon products from smoked pork bellies. In these processes, the raw pork bellies are typically pumped with a brine solution to cure and flavor the meat, hung in a smoke house and smoked. The smoking process heats the raw bellies to remove moisture and return the bellies to their original weight before being pumped. The lowered water activity level of the pork bellies reduces the likelihood that potentially dangerous bacteria can develop in harmful quantities in the fluid. After smoking, the pork bellies are considered bacon slabs. The bacon slabs are typically then pressed into squared shapes and either sliced and packaged or sliced, cooked and packaged.

During slicing, scraps and ends of the bacon slabs are collected for further processing. These remnant parts are often referred to as "ends" and "pieces." The ends and pieces are diced or ground to reduce their size and cooked using one of the aforementioned cooking processes. Upon cooking, the diced ends and pieces form particulate bacon products, known as bacon topping or bacon bits. These bacon bits are packaged and sold for use as a garnish or ingredient for various foods.

Conventional methods for manufacturing bacon bits have a number of shortcomings. First, conventional processes that rely on ends and pieces are unable to satisfy the present market demand for bacon bits. In addition, current processes are unable to use raw pork bellies that are unsuitable or inconvenient for smoking, such as bellies that are too small or irregularly shaped to be pumped and/or smoked. Another difficulty with producing bacon bits from raw pork bellies is that the proteins contained in the pork bellies tend to mix with salts added during the curing process to form a sticky mixture. As such, the ground pork tends to clump together, inhibiting further processing into suitable sized bacon bits.

Various methods have been proposed to cook raw pork bellies directly into bacon bits without first smoking or otherwise pre-conditioning the pork bellies, and without experiencing undesirable clumping caused by salt mixing with the proteins. One proposed method is disclosed in U.S. Pat. No. 5,798,133 to Kunert ("Kunert '133"), which is incorporated herein by reference. Kunert '133 discloses grinding raw bellies (whether whole or just the ends and pieces), and mixing the ground meat with curing agents, water and encapsulated salts. Encapsulated salts are salts contained within fat that prevents any reaction with the meat proteins until the fat is heated to a high enough temperature to melt the fat barrier. The pork/salt mixture is then heated while being continuously agitated to raise the temperature of the meat proteins to a first temperature that causes the proteins to become denatured. Once denatured, the proteins no longer form a sticky substance when mixed with the salt. The mixture is then heated to a second temperature, still while being agitated in a mixer, to a second temperature that melts the fat barrier on the encapsulated salts and allows the salt to mix with the ground pork. Kunert '133 also discloses a two-step procedure in which non-encapsulated salts are added after the ground pork is heated to the first temperature, and the process continues as before. In various embodiments, Kunert '133 also may dice the pork after cooking to reduce the size of the cooked bacon bits. Kunert '133 uses a steam jacketed vacuum kettle or blender to cook the meat, and relies on constant agitation during cooking to break up particles of pork that attach to one another.

Another proposed method for cooking raw pork bellies into bacon bits is provided in U.S. Pat. No. 6,391,355 to Kunert et al. ("Kunert '355"), which is incorporated herein by reference. Kunert '355 discloses a process similar to that disclosed in Kunert '133, with the additional requirement that the product is heated under a vacuum, still while being agitated, in order to cook the bacon in the absence of oxygen, which may help the product achieve a desirable color. Both Kunert '133 and Kunert '355 require continuous agitation of the product during the manufacturing process, which complicates the processing and cooking process.

Other methods for cooking raw pork bellies comprise grinding then cooking the pork. Still other methods comprise cooking then chilling bacon pieces, then passing the bacon slabs through a dicer. One such process is described in U.S. Pat. No. 4,552,768 to Olander, which is incorporated herein by reference. These processes also suffer from various shortcomings.

In light of the shortcomings of the prior art, the present invention provides an alternative method to produce cooked meat products, such as bacon bits, from raw meat, such as whole raw pork bellies and raw pork belly ends and pieces.

SUMMARY OF THE INVENTION

The present invention is a method and apparatus for preparing particulate cooked meat products, such as bacon bits or bacon seasoning. According to one aspect of the present invention, the method comprises the steps of: grinding raw meat to a first size in a first grinder, mixing the ground raw meat with dry cure and water to form a raw meat mixture, cooling the raw meat mixture, and storing the raw meat mixture. The raw meat mixture is then diced to a second size in a first dicer, evenly spread onto a cooking belt, cooked in one or more continuous cooking ovens to form a cooked meat mixture and diced again to a third size in a second dicer.

According to another aspect of the present invention, the method for preparing particulate cooked meat products is used to process raw pork belly meat into particulate cooked pork products. In this aspect of the invention, the method comprises the steps of: grinding raw meat to a first size in a first grinder, mixing the ground raw meat with dry cure, which includes encapsulated salts, and water to form a raw meat mixture. This aspect of the invention further includes the steps of: cooling the raw meat mixture during the mixing step to a first temperature, cooling the raw meat mixture after the mixing step to a second temperature, and storing the raw meat mixture for at least about 12 hours. Further steps of this aspect of the invention include: dicing the raw meat mixture to a second size in a first dicer, evenly spreading the raw meat mixture onto a cooking belt, cooking the raw meat mixture in one or more continuous cooking microwave ovens to form a cooked meat mixture, breaking apart the cooked meat mixture, and dicing the cooked meat mixture to a third size in a second dicer.

According to still another aspect of the present invention, the method for preparing particulate cooked meat products comprises the steps of: dicing a ground raw meat mixture comprising raw pork belly meat, encapsulated salts, dry cure and water to a first size in a first dicer, evenly spreading the diced ground raw meat mixture onto a cooking belt, cooking the diced ground raw meat mixture in one or more continuous cooking microwave ovens to form a cooked meat mixture, and dicing the cooked meat mixture to a second size in a second dicer.

Yet another aspect of the present invention is an apparatus for preparing particulate cooked meat products. The apparatus of this aspect comprises: a first grinder for grinding raw meat to a first size, a mixer for mixing the ground raw meat with dry cure and water to form a raw meat mixture, a means for cooling the raw meat mixture, a storage facility for storing the raw meat mixture, a first dicer for dicing the raw meat mixture to a second size, a cooking belt, one or more continuous cooking ovens for cooking the raw meat mixture into a cooked meat mixture, and a second dicer for dicing the cooked meat mixture to a third size.

BRIEF DESCRIPTION OF THE DRAWINGS

FIG. 5 is a diagram of an embodiment of an apparatus for performing various steps of a cooking stage;

FIG. 6 is a diagram of an embodiment of an apparatus for performing various post-cooking processes;

DETAILED DESCRIPTION OF THE PREFERRED EMBODIMENTS

The present invention provides a method for cooking meat. In one embodiment, the present invention comprises a method for manufacturing bacon bits from raw pork bellies or portions thereof, such as ends and pieces. Although the description of the present invention refers to pork bellies, or simply "pork" or "meat," it is understood that this is not intended to limit the scope or applicability of the invention. The present invention also may be used with other pork cuts and other meats, such as turkey, chicken and beef.

Figure 1:
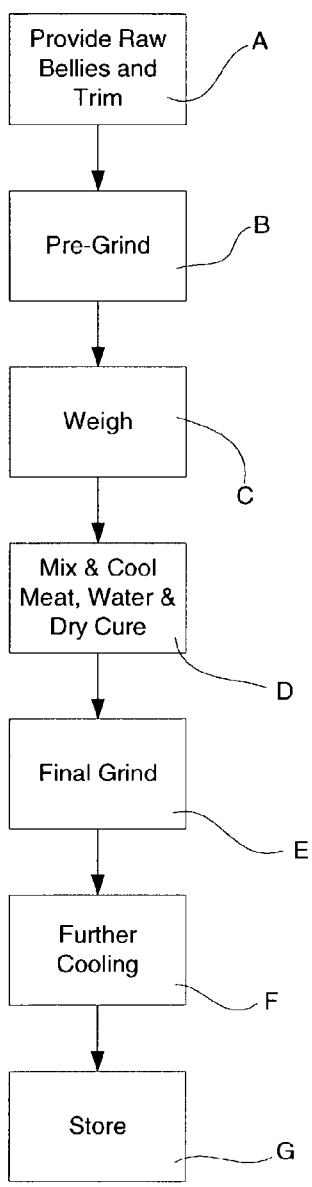
FIG. 1 is a flow diagram of an embodiment of a mixing stage of the present invention.
Figure 2:
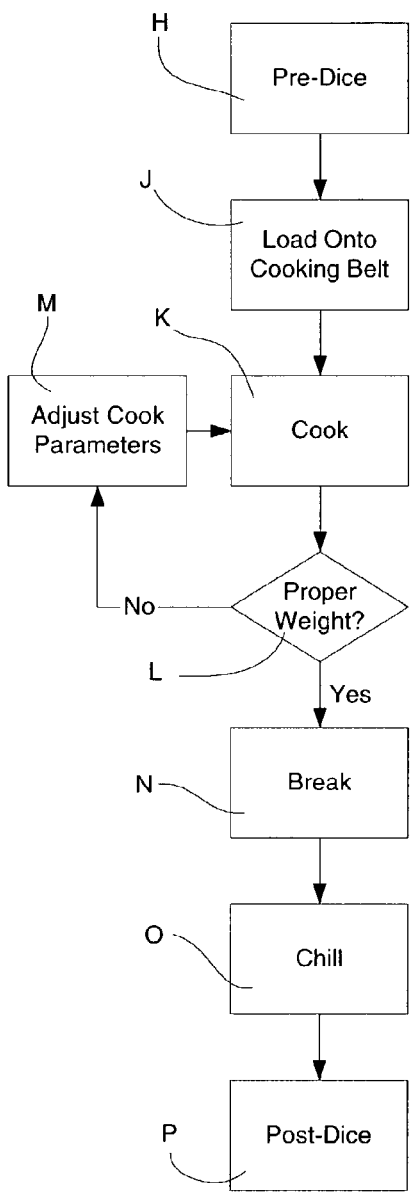
FIG. 2 is a flow diagram of an embodiment of a cooking stage of the present invention.
Figure 3:
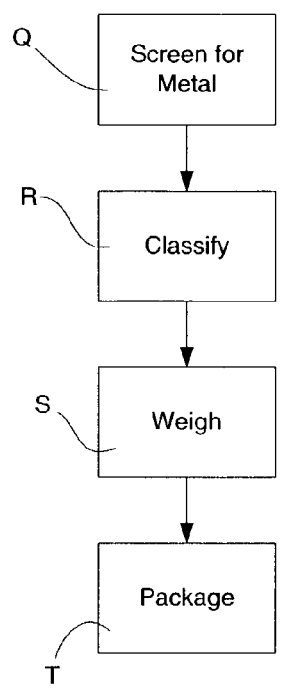
FIG. 3 is a flow diagram of an embodiment of a post-cooking process that may be used with the present invention.

Referring now to the Figures, a process and apparatus of the present invention, and various exemplary and preferred embodiments thereof, are described. FIGS. 1, 2 and 3 are flow charts graphically depicting the mixing, cooking and post-processing stages, respectively, of a preferred embodiment of the present invention. During the mixing stage, raw pork is sized and cured in preparation for cooking. During the cooking stage, the raw pork mixture is cooked and sized to its final size. During the post-processing stage, the cooked pork is prepared for distribution. It will be understood that in various embodiments certain steps in each of the stages described herein may be reordered, supplemented or omitted, and entire stages may be omitted altogether.

Referring now to FIG. 1, various steps in an embodiment of a mixing stage are described. In step A raw meat is provided. As noted before, the raw meat may be any type of pork or other meat, however it is preferred that the meat be raw pork belly meat (that is, whole raw pork bellies and/or parts of raw pork bellies). One reason raw pork bellies are preferred is because they provide a flavorful product. Another reason raw pork bellies are preferred is because they have a fat content that facilitates cooking the meat without adding a liquid cooking medium, such as fat or oil.

The raw meat is reduced in size to facilitate the even application of curing agents, coloring and flavoring. Preferably, the raw meat is reduced in size using a grinder in pre-grind step B. Any suitable grinder may be used for step B, including, for example, those available from Weiler and Company, Inc. of Whitewater, Wis. It has been found that using a ½" plate (i.e., an outlet plate having ½" openings) in the pre-grinding step B provides a suitable, uniformly cured, colored and flavored product. Other size grinders also may be used depending on the desired characteristics of the final product, and grinders having plate sizes of between about ¼" and about 2" may be used with the present invention. In other embodiments, step B may be replaced with a dicing step or any other size-reducing step in lieu of the grinding step.

After the raw meat is reduced in size in step B, it is mixed with water and dry cure ingredients. In order to provide high quality products, the raw meat preferably is measured before mixing with dry cure, water and other cooking ingredients to provide the proper proportion of each ingredient, although this step is not necessary to the present invention. Any number of methods may be used to provide the appropriate amount of raw meat to the mixing process. For example, the raw meat may be measured according to volume or weight and an appropriate amount selected for mixing with a known quantity of dry cure and water. It is believed that weighing the raw meat provides the most accurate measurement for purposes of creating the proper mixture of raw meat, dry cure and water. It is preferred to weigh the raw meat after pre-grind step B, rather than before, because the weight of the raw meat may be reduced during grinding as bone particles and other inclusions are extracted.

In a preferred embodiment, the raw meat is conveyed to one or more silos or other holding devices and weighed, in step C, to provide an appropriate amount of raw meat to be mixed with the dry cure and water. The silos preferably are mounted on load cells to measure the weight of the silo and the meat contained therein. Each silo preferably is equipped with a loss-in-weight control system that may be used in conjunction with the load cell to accurately measure the amount of raw meat that is deposited from the silo, thereby providing an accurate method of determining the amount of raw meat being sent to the mixer. Load cells and loss-in-weight controllers are known in the art and available, for example, from Hardy Instruments, Inc. of San Diego, Calif., which provides the HI 2160 Plus Loss-In-Weight Controller. Other weighing methods and systems will be readily apparent to those of ordinary skill in the art in light of the teachings herein.

The raw meat is mixed with dry cure and water in step D to form a raw meat mixture. A single-shaft, twin-shaft, or intermeshing twin-shaft mixer from Wolfking A/S of Denmark, is preferred for use with the present invention, although other suitable mixers may be used. The dry cure ingredients, which may include any conventionally known ingredients, preserve, flavor and color the meat and provide various other functions as known in the art. In a preferred embodiment, the dry cure comprises a commercially available mixture of 6.25% sodium nitrite and 93.75% salt (by weight) commonly referred to as Prague Powder #2. The dry cure also may comprise other ingredients, such as sodium erythrobate to accelerate the curing process, sodium phosphate to bind water, and sugar to sweeten the final product. In some cases, the use of certain cure ingredients, such as sodium nitrate, may be dictated by legal requirements or prohibitions, and it is preferred, although not required, that the dry cure ingredients be selected to comply with all applicable legal requirements. The selection of cure ingredients to provide different flavors or other benefits to the final product is well known in the art.

In a preferred embodiment, the salt component of the dry cure comprises encapsulated salts. As described in U.S. Pat. No. 5,798,133 to Kunert and discussed elsewhere herein, meat proteins tend to extract when exposed to salt, causing the ground meat to become sticky and unmanageable. In order to prevent the particles of the ground raw meat mixture from conglomerating into a sticky mass, encapsulated salts are used in the dry cure to prevent direct contact between the salt and the raw meat until the raw meat has been heated to the point at which the meat protein becomes denatured, which is at about 120 degrees Fahrenheit. A preferred encapsulated salt for use with the present invention is MORTON ENCAPSULATED SALT WITH DURKOTE®, coating product number 1134-125-75, available from Van den Bergh Foods of Joliet, Ill. The preferred encapsulated salt has a fat barrier layer that melts at about 145 degrees Fahrenheit, which is above the temperature at which the meat protein denatures.

Water is added to the mixture to increase the water content of the final product to help it emulate genuine bacon in flavor and texture. The water also assists with the even distribution of the dry cure ingredients.

In a preferred embodiment the meat, dry cure and water are cooled during mixing step D. Cooling reduces the likelihood of bacterial growth and has also been found to improve product handling in further steps. A preferred cooling method is to directly spray a cooling agent, preferably liquid or gaseous carbon dioxide ($CO_2$), onto the raw meat mixture as it is being mixed. It is contemplated, however, that other gasses or liquids may be used as a cooling agent. In addition, other cooling methods may be used in lieu of direct spraying. For example, the mixer may be encased in a cooling jacket or otherwise be refrigerated.

The $CO_2$ preferably is sprayed directly onto the raw meat and other ingredients as they are being mixed in the mixer to reduce the raw meat mixture's temperature to about 18 to 28 degrees Fahrenheit, and preferably to about 26–28 degrees Fahrenheit. The mixers may be equipped with covers to isolate the raw meat mixture from atmospheric air during mixing and prevent the escape of the cooling agent. The use of gaseous or liquid $CO_2$ has been found to provide the additional benefit that crystals form during the mixing and cooling step D and become entrained in the raw meat mixture. When the crystals melt and/or sublimate they undergo an endothermic reaction as they change phase and become fluid, thereby absorbing heat from their surroundings and further cooling the raw meat mixture. It has been found that the temperature of the raw meat mixture may continue to decline to about 19 degrees Fahrenheit even after the mixing and cooling step D stops.

After the meat, dry cure and water are mixed into a raw meat mixture, the raw meat mixture may be ground in a final grinding step E to further agitate the mixture or facilitate its conveyance. The final grinding step also may be useful to help break up frozen formations that may cause the raw meat to aggregate into clumps, and possibly also reduce the likelihood that such aggregations will form during further cooling and storage. In one embodiment, the raw meat mixture is passed through a grinder having a relatively large plate size, such as a 2" plate or larger. The grinder used in this step preferably is one such as those available from Wolfking A/S of Denmark, or may be any other conventional grinder, such as those described elsewhere herein. In other embodiments, the final grind step E may be omitted in its entirety.

As noted before, the use of gaseous or liquid $CO_2$ (or other suitable liquid or low temperature gas) has been found to provide additional cooling. This post-mixing cooling is illustrated as step F in FIG. 1. This additional cooling may be supplemented by other cooling processes, such as refrigeration. Of course, if $CO_2$ cooling is not used, refrigeration may be mandatory to achieve the final product temperature for storage and further processing.

The cooled raw meat mixture is stored in step G for a period of time prior to cooking to allow the sodium nitrite to cure the meat. It should be noted that the second cooling step F may be combined with the storage step G, and the raw meat mixture preferably is stored in a refrigerated enclosure. During this time, the endothermic melting and/or sublimation of crystals formed in the mixing step D may continue to cool the meat mixture, thereby reducing the amount of additional cooling required to keep the raw meat mixture at the proper temperature during storage. In a preferred embodiment, the cooled raw meat mixture is held for about 12 to about 24 hours at a temperature of up to about 28 degrees Fahrenheit, and most preferably at a temperature of about 19–22 degrees Fahrenheit. Longer storage times, up to 3–4 days, may be acceptable provided the meat does not spoil and the final product provides acceptable color, flavor and consistency. Shorter storage times also may be acceptable provided the quality of the final product is not compromised.

Referring now to FIG. 2, various steps in an embodiment of a cooking stage are described. The first steps in the cooking stage are to remove the cooled raw meat mixture from storage and pre-dice the mixture. When the meat mixture is cooled the individual particles of raw pork may become frozen together. The pre-dicing step H breaks up any large aggregations of raw meat particles.

The pre-dicing step H may be performed using any conventional dicing machine. In a preferred embodiment, a MODEL M DICER, available from Urschel Laboratories, Inc. of Valparaiso, Ind., is used. The size of the dicing blades is selected to break up the meat aggregations and size the meat particles to facilitate their cooking. It has been found that the cool temperature of the raw meat mixture facilitates the dicing step H. However, the cold meat may be brittle, and attempts to dice the meat too finely may cause excessive shattering of the raw meat, causing the particle size to be below desirable levels. It has been found that a two dimensional dicer with a ⅜"×⅜" blade set provides good aggregate break-up and particle sizing without causing excessive waste due to shattering. Pre-dicing blades sets having a size of about ¼"×¼" to about ½×½" also may be used. Blades sets as large as 1"×1" also may be used for raw meat that has had larger pre-grind sizes in step B. Of course, it is anticipated that other size blades may be used to accommodate for variations in the temperature and grind size of the raw meat mixture and to create products having different final sizes for different uses.

Once diced, the raw meat mixture is spread onto a cooking belt in step J. The cooking belt conveys the raw meat mixture through one or more microwave ovens, belt grills, convection ovens or any other suitable convective, radiative or humidative cooker or the like. Combinations of ovens also may be used. Preferably, one or more of the ovens is independently controllable from the others to allow the temperatures of the individual ovens to be tailored to the state of the product passing therethrough.

In order to simplify processing, the meat is not agitated or mixed as it is conveyed through the one or more ovens. As such, it is important to spread the raw meat mixture evenly across the cooking belt to ensure even cooking and minimize waste. The step of spreading the meat onto the cooking belt preferably is performed by machinery that loads the meat onto the belt, and a human operator who evenly spreads the meat. It has been found that human operators provide superior spreading performance, however, it is envisioned that spreading may be performed by suitable machinery, such as a vibratory feed device, that is able to evenly distribute the raw meat mixture.

It has been found that the ability to evenly spread the raw meat mixture onto the cooking belt is particularly influenced by three factors. First, the use of encapsulated salts in the dry cure prevents protein extraction and the stickiness associated therewith that would cause the raw meat mixture to adhere to itself and the machinery and resist even spreading. Second, the pre-dicing step breaks up aggregations of meat particles that are frozen together. Third, the cool temperature makes the meat particles flow more easily and reduces their tendency to adhere to one another. Based on the teachings herein, one of ordinary skill in the art will be able to vary these and other factors, particularly the dicing size and the temperature, to enhance the ability to spread the meat and obtain even cooking.

The cooking belt conveys the raw meat mixture through one or more ovens in the cooking step K. Current regulations of the food industry require the raw meat mixture to be cooked to a certain percentage of its original weight in order to qualify as a fully cooked bacon product. Conventionally prepared bacon product that is pumped and smoked prior to cooking must be reduced to approximately 40% of its green weight. Using the present process, however, the meat is not pumped and smoked down to green weight, and therefore the required 40% yield must be adjusted to take into account the formulated yield of the raw meat mixture (that is, the composition of the raw meat as it exits the mixer). It has been determined that, in a preferred embodiment, a weight reduction to approximately 36% of the uncooked weight provides the equivalent of a 40% yield of green weight, and qualifies the cooked product as fully cooked bacon product. Accordingly, it is preferred that the cooking step K of the present invention be able to reduce the weight of the raw meat mixture to at least about 36% of its original weight. It is further preferred that the present invention be able to provide a weight reduction to about 16–32% of the original weight in order to provide products having different qualities, such as size, texture, flavor, coloration and the like. Of course, other weight reductions, including weight reductions that do not satisfy the regulatory requirements of cooked bacon also may be provided by the present invention. It will be apparent that other methods of validating the cooked meat product may be used in addition to or in lieu of the above described cook yield method. For example, time-temperature methods and instantaneous methods also may be used to validate the cooking of other types of product. Whatever method is used, it is preferred that the method be shown to provide a microbiological kill step that satisfies USDA or other standards for food preparation.

A number of different types of ovens may be used with the present invention, including microwave ovens, belt grills, convection ovens, and the like. Multiple ovens and combinations of different oven types also may be used with the present invention. In order to provide rapid control of product quality (as described below) and to eliminate unnecessary handling steps, it is preferred that the oven(s) be a continuous cooking oven rather than being a batch cooking oven. Continuous cooking ovens that process a substantially continuous supply of raw meat into a substantially continuous supply of cooked meat without interruption of the process, and typically comprise a continuously moving conveyor to carry the meat into and out of the oven. Furthermore, in order to reduce the complexity of the cooking operation and apparatus and increase the safety of the system, it is also preferred that the oven(s) be able to cook without the addition of fat or oil (or any other supplemental liquid heating medium), agitating the meat or the use of a pressure or vacuum chamber.

Microwave ovens have been found to provide good control of the cooking rate and quality of the final product, and are preferred. Preferably, a series of microwave ovens are placed end-to-end along the path of the cooking belt. In some cases, multiple ovens may be integrated into a single oven structure containing multiple cooking "cavities" that each contain a cooking unit. These cavities can be thought of as individual ovens, and single "ovens" having multiple cooking cavities are referred to herein as a series of ovens. In a preferred embodiment, a 5-cavity microwave oven is used, such as those available from Amana Commercial Products Division of Amana, Iowa under the designation QMP2103 RADARLINE.

The cooking temperature in each cavity (i.e., oven) preferably may be adjusted individually to provide an appropriate cooking rate, and the use of microwave ovens provides relatively fast adjustments to cooking parameters. For example, in one embodiment, earlier cavities operate at a higher energy level (typically measured in units of kilowatts) to heat the chilled and relatively moist raw meat mixture, while later cavities operate at a lower energy level to prevent overcooking. In a typical operation, the ovens operate to produce temperatures of about 180–210 degrees Fahrenheit, although other temperatures may be used to accelerate or slow the cooking rate. It has been found that factors important to properly adjusting the microwave cavities include, inter alia: pre-dice size, raw meat mixture temperature, weight of product per unit area of the belt, and most importantly, the moisture content of the product (often correlated to the leanness of the meat) which can vary greatly from one pork belly to the next.

In order to ensure that the cooked meat obtains the desired final weight reduction, an iterative, feed-forward or feedback quality control process may be used to measure the cooked meat quality and make corresponding adjustments to the oven(s) performing the cooking step K. Such quality control steps are desirable because raw meat typically has variable properties, such as moisture content, fat content, and the like, that necessitate periodic or continuous adjustment of the oven(s) to ensure continued high quality output.

In one embodiment, the quality control process comprises weighing a sample of cooked meat, step L, and adjusting the cooking parameters, step M, if the weight is not suitable. Later weight measurements may be used to determine whether additional adjustments are necessary. Of course, any other quality control measurements also may be made to determine whether the cooked meat has the desired weight, color, flavor, texture and the like. Advantageously, the quality control process, steps L and M, may be used in conjunction with a continuous cooker to provide relatively rapid control of the output. If the output is found to be unsatisfactory, the oven or ovens may be adjusted to provide better results without sacrificing a large amount of product. This benefit is not possible with batch cooking ovens such as kettle cookers, because the final quality of the meat is unknown until all of the meat in the batch is cooked. In another embodiment, the quality control process, steps L and M, also may include a pre-cook diagnostic apparatus that determines the amount and/or density of raw meat mixture that is entering the ovens and automatically adjusts the oven output accordingly. An example of such a device and process is provided in U.S. Pat. No. 6,157,074 to Goranson, which is incorporated herein by reference. The use of multiple ovens also may allow quality control measurements of the meat to be taken between the ovens to further improve the quality of the final product.

During cooking, the meat heats to about 120 degrees Fahrenheit, at which point the meat proteins begin to denature. As the meat temperature continues to rise to about 145 degrees Fahrenheit, the fat barrier layer on the encapsulated salts melts, allowing the salt to interact with the cooking meat. In an embodiment comprising multiple ovens, the ovens may be adjusted to first heat the meat at a temperature and for a time sufficient to denature substantially all of the meat protein, then subsequently heat the meat to a temperature sufficient to melt the fat barrier on the encapsulated salts. Using this method, the amount of interaction between the non-denatured proteins and the salt can be reduced.

Despite the use of encapsulated salts, the meat tends to bond to itself to some degree during the cooking process because it is not agitated. As such, the meat emerges from the oven or ovens as a sheet of cooked meat. In a preferred embodiment, a breaker arm is used to break the sheet of cooked meat into chunks, step N, as it emerges from the oven. The breaker arm may comprise any device suited to break apart the sheet of cooked meat.

After being broken into chunks, the cooked meat is passed through a chilling room or chamber, step O, to reduce its temperature. Cooling the meat in the chilling room causes the fat on the surface of the meat to solidify on the product, rather on any subsequent machinery, which may reduce the efficiency of the machines, or on the final product packaging, which might cause unsightly smearing. Any commercially available chilling tunnel or chamber may be used for this step.

The final step of the cooking stage is to dice the cooked meat to its final size in the post-dice step P. The post-dice step may be performed by any suitable dicing machine, such as those described above with reference to the pre-dice step H. The size of the dicing blade in the post-dicer may be varied to provide different size products for different applications or customers. In a preferred embodiment, the post-dicer has a ¼"×¼" to ⅜"×⅜" blade set for producing bacon bit products suitable as a garnishment for other foods. Other blade sets having a size of about ⅛"×⅛" to about 1"×1" also may be used in the post-dicer. In other embodiments, the blade sets may include non-square sets, such as a ¼"×1" blade set. Of course, it is anticipated that other size blades may be used to create products having different final sizes for different uses.

Various additional steps may be performed after the meat is cooked and diced to its final size. Referring now to FIG. 3, an exemplary post-cooking process is described. After the meat is cooked and diced to its final size, it is screened for metal inclusions, in step Q, by a metal detector. In a preferred embodiment, the product is passed through a metal detector suitable for processing food. Suitable metal detectors are known in the art. Once screened, the product is classified by size, in step R, to separate larger bacon bits from smaller ones. Classifiers, such as shakers, also are known in the art. Once classified, the product is weighed, step S, and packaged, step T.

Figure 4:
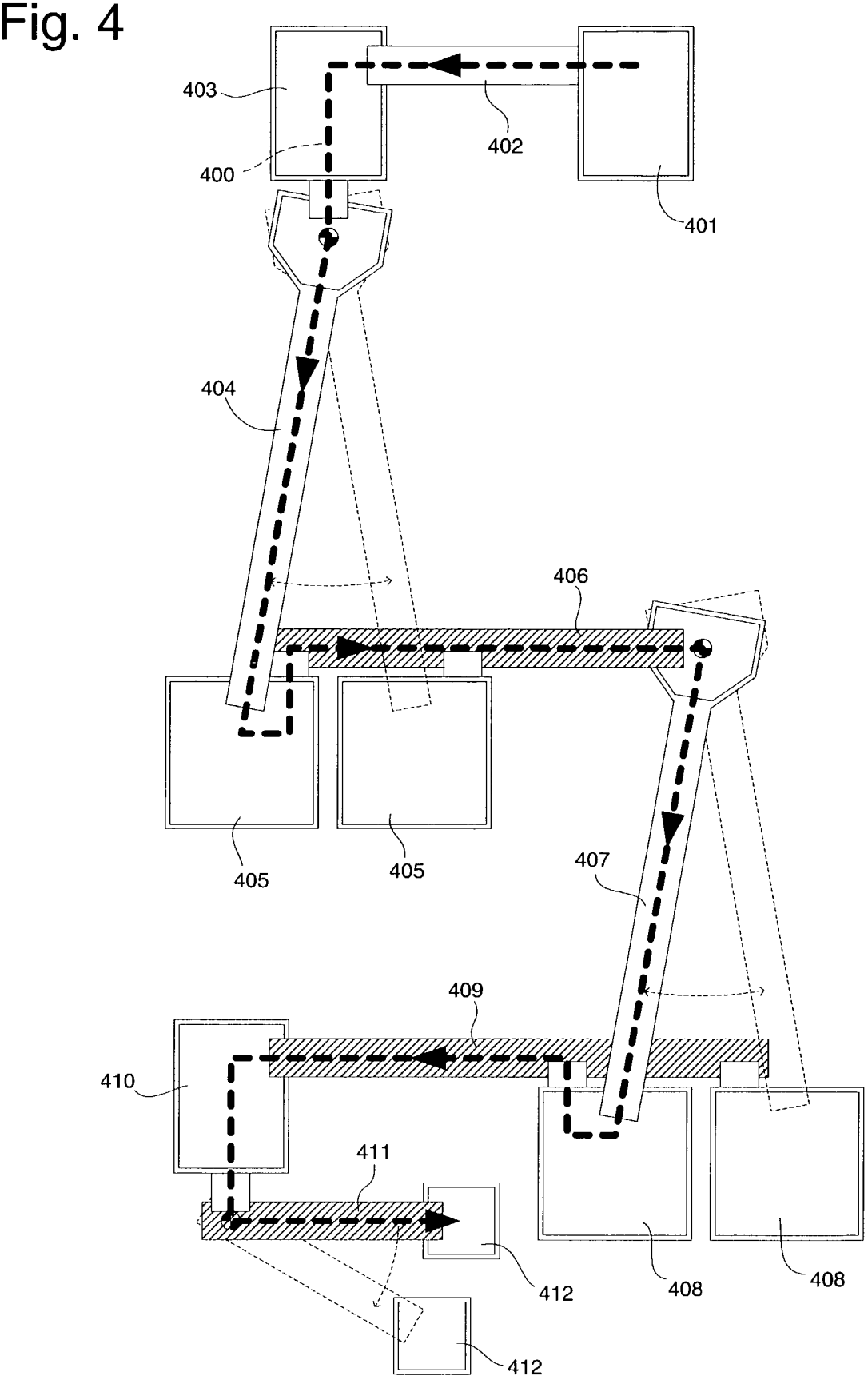
FIG. 4 is a diagram of an embodiment of an apparatus for performing various steps of a mixing stage.

Having described numerous embodiments of the processing steps of the present invention in detail, various embodiments of processing apparatus for performing the process of the present invention will now be explained in detail with reference to FIGS. 4, 5 and 6. FIG. 4 depicts an apparatus for performing various steps of a mixing stage, FIG. 5 depicts an apparatus for performing various steps of a cooking stage, and FIG. 6 depicts an apparatus for performing various post-cooking processes.

FIG. 4 depicts an embodiment of an apparatus for performing various steps of an embodiment of a mixing stage. Path 400 demonstrates the typical path of the raw meat, however, as will be clear from the explanation below, the path may vary slightly during production to facilitate continuous operation. Raw meat, in the form of bellies or parts of bellies in the case of a bacon bit manufacturing operation, is provided to the apparatus by any suitable device, such as cardboard bins or containers (often referred to as "combos"). The raw meat is placed into a hopper 401 that feeds into a first screw conveyor 402 or similar device for inducting the raw meat into a first grinder 403.

The first grinder 403 grinds the meat to a specified size and passes the ground raw meat to a second screw conveyor 404. The second screw conveyor 404 carries the ground meat to one or more containers, known as "silos" 405. Although a fixed second screw conveyor 404 and single silo 405 may be used, it is preferred that the second screw conveyor 404 comprises a pivoting apparatus that rotates to convey the meat consecutive empty silos 405 whenever the target silo 405 is filled. This feature facilitates continuous operation of the process.

Each silo 405 comprises a load cell and a loss-in-weight controller that may be operated to dispense a known weight of meat from the silo. The silo or silos 405 preferably deposit the meat onto a first belt conveyor 406. The first belt conveyor 406 conveys the meat to a third screw conveyor 407. The third screw conveyor 407, preferably a pivoting conveyor, conveys the meat to one or more mixers 408. Again, a number of mixers 408 may be used to facilitate continuous operation of the process.

Each mixer preferably comprises a single-shaft, twin-shaft, or intermeshing twin-shaft mixer from Wolfking A/S of Denmark. Additional apparatus (not shown) may be used for depositing water and dry cure ingredients into each mixer 408, or this may be done manually. In addition, a coolant source, such as $CO_2$ nozzles may be fitted within or in the proximity of each mixer 408, or the mixers 408 may otherwise be equipped with cooling apparatus. In a preferred embodiment, the mixers 408 are also equipped with closable lids to facilitate cooling and prevent the escape of materials during mixing.

The mixers 408 preferably are equipped with augers to deposit the raw meat mixture, once it is fully mixed, onto a second belt conveyor 409. The second belt conveyor 409 conveys the raw meat mixture to a second grinder 410 (which may be any suitable grinder, such as those described with reference to the first grinder 403) for the final grinding step E. After being ground again, the raw meat mixture is deposited onto a third belt conveyor 411 and conveyed to one or more vats 412. As with the second and third screw conveyors 404,407, the third belt conveyor may comprise a pivoting conveyor that rotates to deposit the raw meat mixture into successive empty vats to facilitate continuous processing. In other embodiments, the final grinding step E may be omitted and the second belt conveyor 409 may deposit the raw meat mixture directly into the vats 412. The vats 412 are conveyed, either automatically or by hand, to a storage room (not shown) which preferably is refrigerated to help keep the raw meat mixture cool.

FIG. 5 depicts an embodiment of an apparatus for performing various steps of an embodiment of a cooking stage. The process flow is shown generally by arrow 500. In the cooking stage, vats of chilled raw meat mixture are received by a dumping device 501 that conveys the raw meat mixture to a fourth belt conveyor 502. The fourth belt conveyor 400 deposits the raw meat mixture into a first dicer 503 for the pre-dicing step H. A preferred dicer for this operation is the MODEL M DICER from Urschel Laboratories, Inc. of Valparaiso, Ind.

After the raw meat mixture is diced by the first dicer 503, it is deposited onto a cooking belt 504. As noted before, at this point the raw meat mixture preferably is spread uniformly across the cooking belt 504 to ensure that it is evenly cooked by the ovens 505. The cooking belt 504 should be selected to be compatible with the ovens 505, and may be supplied as an integrated part of the ovens 505, and preferably comprises a microwave transparent material that is USDA approved for food contact applications.

The cooking belt 504 conveys the meat through a series of one or more ovens 505 that cook the meat. As noted before, the one or more ovens preferably comprise microwave ovens, such as a 5-cavity QMP2103 RADARLINE Microwave from Amana Commercial Products Division of Amana, Iowa, but other types of oven may be used. The ovens 505 preferably comprise byproduct evacuation and ventilation means to remove liquefied fat, smoke, vapors and other cooking byproducts, and preferably are constructed from materials and in a manner that allows appropriate cleaning.

Figure 7:
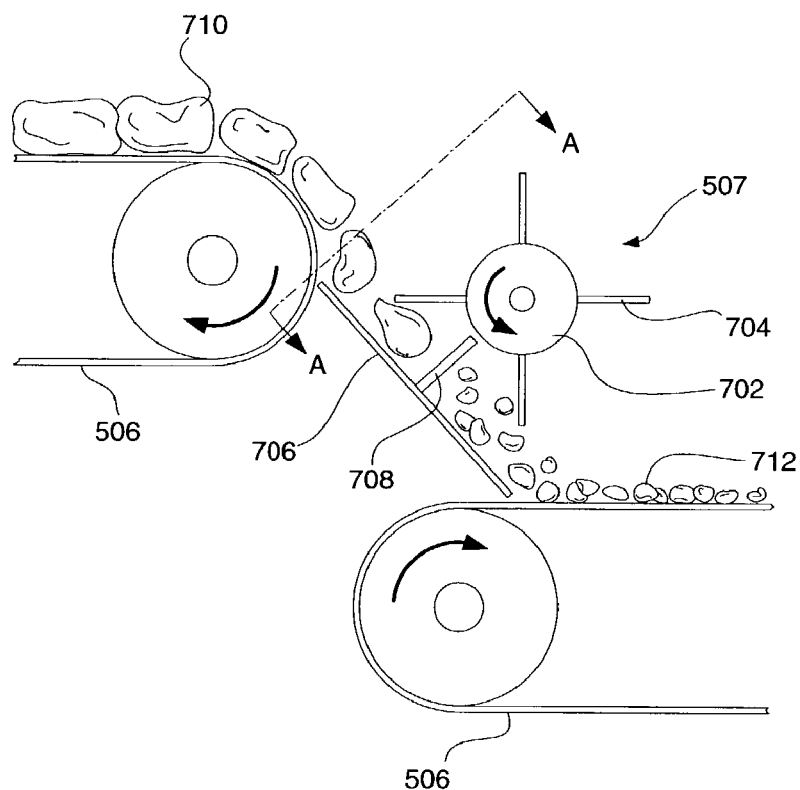
FIG. 7 is a side view of an embodiment of a breaker arm assembly that may be used with the present invention.
Figure 8:
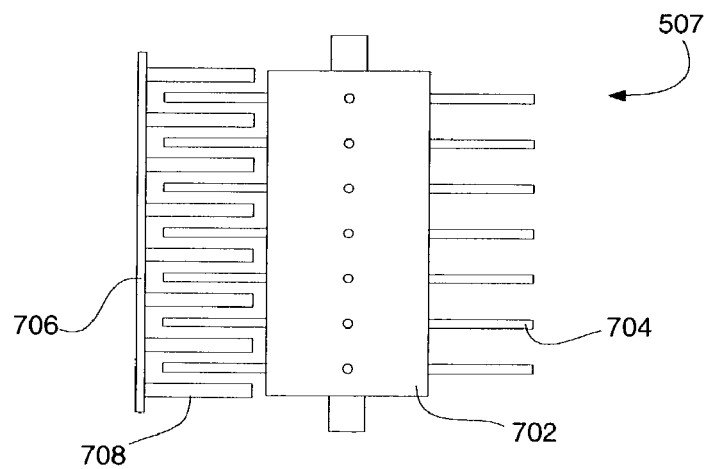
FIG. 8 is the breaker arm assembly of FIG. 7, as viewed from line AA of FIG. 7.

After exiting the ovens 505, the cooking belt 504 deposits the sheet-like cooked meat onto a fifth belt conveyor 506 that carries the cooked meat to a breaker arm assembly 507 or a similar device for breaking apart the cooked meat. Referring now to FIGS. 7 and 8, an embodiment of a preferred breaker arm is described. The preferred breaker arm assembly 507 is positioned between two parts of the fifth belt conveyor 506 and located to receive large chunks 710 of cooked meat as they exit the oven. The preferred breaker arm assembly 507 comprises a rotating assembly 702 comprising one or more rotating arms or paddles 704, and a base plate 706 comprising one or more fixed arms or paddles 708. As the rotating assembly 702 rotates, the rotating arms 704 pass between the fixed arms 708, as shown in FIG. 8, and break apart any large chunks 710 trapped between the rotating arms 704 and the fixed arms 708. A gap may be provided between the rotating arms 704 and fixed arms 708 to reduce the amount of shear that the cooked meat experiences. By changing the number, shape and size of the rotating arms 704 and fixed arms 708 and adjusting the gap between them, the amount of breakage and the size of the small chunks 712 that emerge from the breaker arm assembly 507 can be controlled. The base plate 706 acts as a slide to help convey the large and small chunks 710, 712 as they are being processed.

After passing through the breaker arm assembly 507, the cooked meat is conveyed through a chilling room 508 or an equivalent device, such as a commercial chilling tunnel, that reduces the temperature of the cooked meat.

The fifth belt conveyor 506 carries the cooked meat to a second dicer 509 for the post-dice step P. The second dicer 509 preferably comprises an Urschel MODEL M DICER, but alternatively may comprise any other suitable dicing machine. The diced cooked meat exits the second dicer 509 onto a sixth belt conveyor 510, which may comprise any suitable conveying apparatus.

FIG. 6 depicts an embodiment of an apparatus for performing various post-cooking processes, in which the process flow generally follows arrow 600. In the depicted embodiment, the cooked and diced meat is conveyed on the sixth belt conveyor 510 to a metal detector 601. After being screened for metal inclusions, the product is fed into a classifier 602 for sorting by different sizes. For convenience, the metal detector 601 may be mounted above the classifier 602 to feed the product into the classifier 602 by simple gravity feed. The classified product is conveyed by one or more screw conveyors 603 to scales 604, where the product is weighed for packaging. Once weighed, the product is packaged for sale or delivery by a packaging device 605.

Persons of ordinary skill in the art will appreciate that steps and processes described herein with reference to FIGS. 1, 2 and 3 may be performed in any suitable order, omitted, supplemented by other steps, modified or otherwise altered to produce suitable cooked meat products. The steps and processes herein also may, without undue experimentation, be modified to produce cooked meat products from meats other than pork, such as from beef, chicken and turkey, as will be understood by those of ordinary skill in the art. In addition, although the embodiments have been described with reference to certain preferred apparatus, it will be readily understood from the present teachings that similar devices may be used in place of many of the devices described herein. For example, it will be understood that belt conveyors may be split into multiple parts or replaced, in some instances with screw conveyors, or conveyors can be omitted or modified. Various devices also may be combined, or devices may be substituted by manual operators. Other variations will be apparent to those skilled in the art.

We claim:

1. A method for preparing particulate cooked meat products, the method comprising the steps of:
   grinding raw meat to a first size in a first grinder;
   mixing the ground raw meat with dry cure and water to form a raw meat mixture;
   cooling the raw meat mixture;
   storing the raw meat mixture;
   dicing the raw meat mixture to a second size in a first dicer;
   evenly spreading the raw meat mixture onto a cooking belt;
   cooking the raw meat mixture in one or more continuous cooking ovens to form a cooked meat mixture; and
   dicing the cooked meat mixture to a third size in a second dicer.

2. The method of claim 1, wherein the raw meat comprises raw pork belly meat.

3. The method of claim 1, wherein the step of grinding the raw meat to a first size comprises grinding the raw meat in a first grinder having a ½" plate.

4. The method of claim 1, further comprising the steps of:
   conveying the ground raw meat to one or more silos;
   weighing the ground raw meat in the one or more silos; and
   extracting a measured weight of ground raw meat from the one or more silos.

5. The method of claim 1, wherein the dry cure comprises encapsulated salts.

6. The method of claim 1, wherein the wherein the step of cooling the raw meat mixture comprises:
cooling the raw meat mixture during the mixing step to a first temperature; and
cooling the raw meat mixture after the mixing step to a second temperature.

7. The method of claim 6, wherein the step of cooling the raw meat mixture during the mixing step comprises applying carbon dioxide to the raw meat mixture.

8. The method of claim 6, wherein the step of cooling the raw meat mixture during the mixing step comprises cooling the raw meat mixture to about 18–28 degrees Fahrenheit.

9. The method of claim 6, wherein the step of cooling the raw meat mixture during the mixing step comprises cooling the raw meat mixture to about 26–28 degrees Fahrenheit.

10. The method of claim 6, wherein the step of cooling the raw meat mixture after the mixing step comprises cooling the raw meat mixture to about 19–28 degrees Fahrenheit.

11. The method of claim 6, wherein the step of cooling the raw meat mixture after the mixing step comprises cooling the raw meat mixture to about 19–22 degrees Fahrenheit.

12. The method of claim 6, wherein the step of cooling the raw meat mixture after the mixing step comprises cooling the raw meat mixture by endothermic phase change cooling.

13. The method of claim 1, further comprising grinding the raw meat mixture in a second grinder.

14. The method of claim 13, wherein the second grinder has an orifice size greater than about 2".

15. The method of claim 1, wherein the step of storing the raw meat mixture comprises storing the raw meat mixture for at least about 12 hours.

16. The method of claim 1, where in the step of storing the raw meat mixture comprises storing the raw meat mixture for about 12 to about 72 hours.

17. The method of claim 1, wherein the step of dicing the raw meat to a second size comprises dicing the raw meat in a first dicer having about a 1/4"×1/4" to about a 1/2"×1/2" blade set.

18. The method of claim 1, wherein the step of dicing the raw meat to a second size comprises dicing the raw meat in a first dicer having about a 5/16"×5/16" to about a 7/16"×7/16" blade set.

19. The method of claim 1, wherein the step of dicing the raw meat to a second size comprises dicing the raw meat in a first dicer having about a 3/8"×3/8" blade set.

20. The method of claim 1, wherein the one or more continuous cooking ovens are selected from the group consisting of: microwave ovens, convection ovens and belt grills.

21. The method of claim 1, wherein the one or more continuous cooking ovens comprise more than one oven, at least one of the more than one ovens being independently controllable.

22. The method of claim 1, wherein the one or more continuous cooking ovens comprise five serially arranged microwave ovens.

23. The method of claim 1 wherein the step of cooking the raw meat mixture further comprises cooking the raw meat mixture at a temperature of about 180–210 degrees Fahrenheit.

24. The method of claim 1 wherein the step of cooking the raw meat mixture further comprises cooking the raw meat mixture to less than about 36% its original weight.

25. The method of claim 1 wherein the step of cooking the raw meat mixture further comprises cooking the raw meat mixture to less than about 16–32% its original weight.

26. The method of claim 1, further comprising breaking apart the cooked meat mixture.

27. The method of claim 1, wherein the step of dicing the raw meat to a third size comprises dicing the raw meat in a second dicer having about a 1/8"×1/8" to about a 1"×1" blade set.

28. The method of claim 1, wherein the step of dicing the raw meat to a third size comprises dicing the raw meat in a second dicer having about a 3/16"×3/16" to about a 11/16"×11/16" blade set.

29. The method of claim 1, wherein the step of dicing the raw meat to a third size comprises dicing the raw meat in a second dicer having about a 1/4"×1/4" to about a 3/8"×3/8" blade set.

30. The method of claim 1, further comprising one or more steps chosen from the group of screening the cooked meat mixture for metal, classifying the cooked meat mixture by size, weighing the cooked meat mixture and packaging the cooked meat mixture.

31. A method for processing raw pork belly meat into particulate cooked park products, the method comprising the steps of:
grinding raw meat to a first size in a first grinder;
mixing the ground raw meat with dry cure and water to form a raw meat mixture, the dry cure comprising encapsulated salts;
cooling the raw meat mixture during the mixing step to a first temperature;
cooling the raw meat mixture after the mixing step to a second temperature;
storing the raw meat mixture for at least about 12 hours;
dicing the raw meat mixture to a second size in a first dicer;
evenly spreading the raw meat mixture onto a cooking belt;
cooking the raw meat mixture in one or more continuous cooking microwave ovens to form a cooked meat mixture;
breaking apart the cooked meat mixture; and
dicing the cooked meat mixture to a third size in a second dicer.

32. The method of claim 31, wherein the step of grinding the raw meat to a first size comprises grinding the raw meat in a first grinder having a 1/2" plate.

33. The method of claim 31, wherein the step of cooling the raw meat mixture during the mixing step comprises cooling the raw meat mixture to about 26–28 degrees Fahrenheit.

34. The method of claim 31, wherein the step of cooling the raw meat mixture after the mixing step comprises cooling the raw met mixture to about 19–22 degrees Fahrenheit.

35. The method of claim 31, farther comprising grinding the raw meat mixture to a second size in a second grinder having at least about a 2" plate.

36. The method of claim 31, wherein the step of dicing the raw meat to a second size comprises dicing the raw meat in a first dicer having about a 3/8"×3/8" blade set.

37. The method of claim 31, where in the step of cooking the raw meat mixture further comprises cooking the raw meat mixture to less than about 16–32% its original weight.

38. The method of claim 31, wherein the step of dicing the raw meat to a third size comprises dicing the raw meat in a second dicer having about a 1/4"×1/4" to about a 3/8"×3/8" blade set.

39. A method for preparing particulate cooked pork products, the method comprising the steps of:
- dicing a ground raw meat mixture comprising raw pork belly meat, encapsulated salts, dry cure and water to a first size in a first dicer;
- evenly spreading the diced wound raw meat mixture onto a cooking belt;
- cooking the diced ground raw meat mixture in one or more continuous cooking microwave ovens to form a cooked meat mixture; and
- dicing the cooked meat mixture to a second size in a second dicer.

40. An apparatus for preparing particulate cooked meat products, the apparatus comprising:
- a first grinder for grinding raw meat to a first size;
- a mixer for mixing the ground raw meat with dry cure and water to form a raw meat mixture;
- a means for cooling the raw meat mixture;
- a storage facility for storing the raw meat mixture;
- a first dicer for dicing the raw meat mixture to a second size; a cooking belt;
- one or more continuous cooking ovens for cooking the raw meat mixture into a cooked meat mixture; and
- a second dicer for dicing the cooked meat mixture to a third size.

41. The apparatus of claim 40, wherein the first grinder has a 1/2" plate.

42. The apparatus of claim 40, further comprising at least one silos, the silo comprising a scale for measuring the weight of the ground raw meat.

43. The apparatus of claim 40, wherein the means for cooling the raw meat mixture comprises a carbon dioxide sprayer.

44. The apparatus of claim 40, wherein the means for cooling the raw meat mixture comprises a refrigerator.

45. The apparatus of claim 40, further comprising a second grinder for grinding the raw meat mixture.

46. The apparatus of claim 45, wherein the second grinder has at least about a 2" plate.

47. The apparatus of claim 40, wherein the first dicer has about a 1/4"×1/4" to about a 1/2"×1/2" blade set.

48. The apparatus of claim 40, wherein the first dicer has about a 5/16"×5/16" to about a 7/16"×7/16" blade set.

49. The apparatus of claim 40, wherein the first dicer has about a 3/8"×3/8" blade set.

50. The apparatus of claim 40, wherein the one or more continuous cooking ovens are selected from the group consisting of: microwave ovens, convection ovens and belt grills.

51. The apparatus of claim 40, wherein the one or more continuous cooking ovens comprise more than one oven, at least one of the more than one ovens being independently controllable.

52. The apparatus of claim 40, wherein the one or more continuous cooking ovens comprise five serially arranged microwave ovens.

53. The apparatus of claim 40, further comprising a breaker arm assembly for breaking apart the cooked meat Mixture.

54. The apparatus of claim 40, wherein the second dicer has about a 1/8"×1/8" to about a 1"×1" blade set.

55. The apparatus of claim 40, wherein the second dicer has about a 3/16"×3/16" to about a 11/16"×11/16" blade set.

56. The apparatus of claim 40, wherein the second dicer has about a 1/4"×1/4" to about a 3/8"×3/8" blade set.

57. The apparatus of claim 40, further comprising one or more apparatus chosen from the set consisting of: a metal detector for screening the cooked meat mixture for metal, a classifier for classifying the cooked meat mixture by size, a scale for weighing the cooked meat mixture and a packaging means for packaging the cooked meat mixture.

* * * * *